United States Patent [19]

Hurth

[11] Patent Number: 5,329,828
[45] Date of Patent: Jul. 19, 1994

[54] THREE-SHAFT GEARBOX WITH DUAL INPUT MOTORS

[75] Inventor: Fritz C. A. Hurth, Montagnola, Switzerland

[73] Assignee: Clark-Hurth Components S.p.A., Italy

[21] Appl. No.: 990,534

[22] Filed: Dec. 14, 1992

Related U.S. Application Data

[62] Division of Ser. No. 788,329, Nov. 5, 1991.

[51] Int. Cl.$^5$ .............................................. F16H 37/06
[52] U.S. Cl. .................................. 74/661; 74/665 B; 74/730.1
[58] Field of Search ................. 74/661, 665 R, 665 A, 74/665 B, 665 D, 665 E, 730.1

[56] References Cited

U.S. PATENT DOCUMENTS

| | | |
|---|---|---|
| B 584,520 | 1/1976 | Rice . |
| 2,380,889 | 7/1945 | Waseige .................... 74/661 X R |
| 2,717,523 | 9/1955 | Lammerz ..................... 74/661 X |
| 2,943,503 | 7/1960 | Förster . |
| 2,970,482 | 2/1961 | Strehlow et al. . |
| 3,166,952 | 1/1965 | Lang . |
| 3,421,389 | 1/1969 | Fauchere . |
| 3,468,192 | 9/1969 | Nasvytis . |
| 3,492,891 | 2/1970 | Livezey . |
| 3,503,278 | 3/1970 | Livezey ..................... 74/661 X |
| 3,637,036 | 1/1972 | Swisher, Jr. et al. . |
| 3,655,004 | 4/1972 | Hoashi . |
| 3,748,927 | 7/1973 | Hertzog et al. . |
| 3,884,095 | 5/1975 | Miyao et al. . |
| 3,916,714 | 11/1975 | Sisson et al. ................ 74/360 X |
| 3,947,403 | 5/1976 | McCready . |
| 3,961,546 | 6/1976 | Gilmore et al. . |
| 4,155,277 | 5/1979 | Minami et al. . |
| 4,170,905 | 10/1979 | Collin ..................... 74/661 O R |
| 4,187,739 | 2/1980 | Hamma et al. . |
| 4,269,281 | 5/1981 | Schneider et al. . |
| 4,392,393 | 7/1983 | Montgomery ............... 74/661 O R |
| 4,414,863 | 11/1983 | Heino . |
| 4,416,925 | 11/1983 | Goll . |
| 4,485,687 | 12/1984 | Burke et al. ................ 74/360 X |
| 4,513,631 | 4/1985 | Koivunen ..................... 74/360 X |
| 4,556,589 | 12/1985 | Neumann et al. . |
| 4,561,250 | 12/1985 | Aoyagi et al. . |
| 4,563,917 | 1/1986 | Higashi et al. . |

(List continued on next page.)

FOREIGN PATENT DOCUMENTS

| | | |
|---|---|---|
| 174560 | 3/1986 | European Pat. Off. . |
| 175192 | 3/1986 | European Pat. Off. . |
| 322202 | 6/1989 | European Pat. Off. . |
| 344713 | 12/1989 | European Pat. Off. . |
| 460584 | 12/1991 | European Pat. Off. . |
| 0469451A1 | 2/1992 | European Pat. Off. . |
| 483543 | 5/1992 | European Pat. Off. . |
| 887663 | 8/1953 | Fed. Rep. of Germany . |
| 2644113 | 4/1978 | Fed. Rep. of Germany . |
| 3621545 | 1/1988 | Fed. Rep. of Germany . |
| 1414838 | 9/1965 | France . |
| 63-246561 | 10/1988 | Japan . |
| 3-140657 | 6/1991 | Japan . |
| 974532 | 11/1964 | United Kingdom . |
| 1070754 | 6/1967 | United Kingdom . |
| 2104671 | 8/1979 | United Kingdom . |
| 2110324 | 6/1983 | United Kingdom . |
| 2229797 | 10/1990 | United Kingdom . |

Primary Examiner—Leslie A. Braun
Assistant Examiner—Daniel Wittels
Attorney, Agent, or Firm—Dressler, Goldsmith, Shore & Milnamow

[57] ABSTRACT

The present invention relates to a three-shaft gearbox particularly for industrial vehicles in general, which comprises an input shaft which is associable with a power unit and selectively interacts with a first countershaft or with a second countershaft. The first countershaft rigidly rotationally supports odd-numbered speed gears, whereas the second countershaft rigidly rotationally supports even-numbered speed gears. The first countershaft and the second countershaft are mutually disconnected. The even-numbered speed gears and the odd-numbered speed gears mesh with respective output gears, which are supported by an output shaft and can be selectively rigidly rotationally associated with the output shaft.

2 Claims, 2 Drawing Sheets

U.S. PATENT DOCUMENTS

| | | |
|---|---|---|
| 4,581,949 | 4/1986 | Mann et al. . |
| 4,605,358 | 8/1986 | Burandt . |
| 4,652,466 | 3/1987 | Thoma et al. . |
| 4,658,676 | 4/1987 | Furusawa et al. . |
| 4,679,454 | 7/1987 | Polak .................................. 74/359 X |
| 4,685,354 | 8/1987 | McCabria . |
| 4,699,809 | 10/1987 | Maruhashi et al. . |
| 4,702,127 | 10/1987 | Cote . |
| 4,730,519 | 3/1988 | Nakamura et al. . |
| 4,766,177 | 8/1988 | Miller et al. . |
| 4,774,146 | 9/1988 | Dehennau et al. . |
| 4,796,485 | 1/1989 | Ebina . |
| 4,803,897 | 2/1989 | Reed . |
| 4,807,493 | 2/1989 | Loeffler . |
| 4,845,621 | 6/1989 | Kawata et al. . |
| 4,964,313 | 10/1990 | Davis . |
| 4,983,149 | 1/1991 | Kita . |
| 5,108,043 | 4/1992 | Canavespe ........................ 74/661 X |

THREE-SHAFT GEARBOX WITH DUAL INPUT MOTORS

This application is a division of application Ser. No. 07/788,329, filed Nov. 5, 1991.

BACKGROUND OF THE INVENTION

The present invention relates to a three-shaft gearbox, particularly for industrial vehicles in general, which comprises a shaft associated with the output and two countershafts which can be connected to the first shaft by means of clutches.

In industrial vehicles in general, there is a technical problem related to changing the speed ratio when the vehicle is under stress, or rather related to shifting speeds while torque is applied, as well as to the automation of said shifts in an easy manner so as to avoid distracting the operator from the maneuvers he is performing.

SUMMARY OF THE INVENTION

The aim of the present invention is to eliminate or substantially reduce the disadvantages in known types of gearbox by providing a three-shaft gearbox particularly for industrial vehicles in general.

A first application of this concept provides the association of the two countershafts with the heat engine in input by means of two friction clutches and of gears, so as to allow to change speeds without interrupting the flow of power, using always and only said two friction clutches, whereas the clutches which connect the output shaft to the first countershaft are those for preselecting the odd-numbered speeds and the couplings which connect the input shaft to the other countershaft are those for preselecting the even-numbered speeds.

BRIEF DESCRIPTION OF THE DRAWINGS

Further characteristics and advantages of this first application of the invention will become apparent from the description of a preferred but not exclusive embodiment, illustrated only by way of non-limitative example in the accompanying drawings, wherein.

BRIEF DESCRIPTION OF THE PREFERRED EMBODIMENTS

Figure 1:
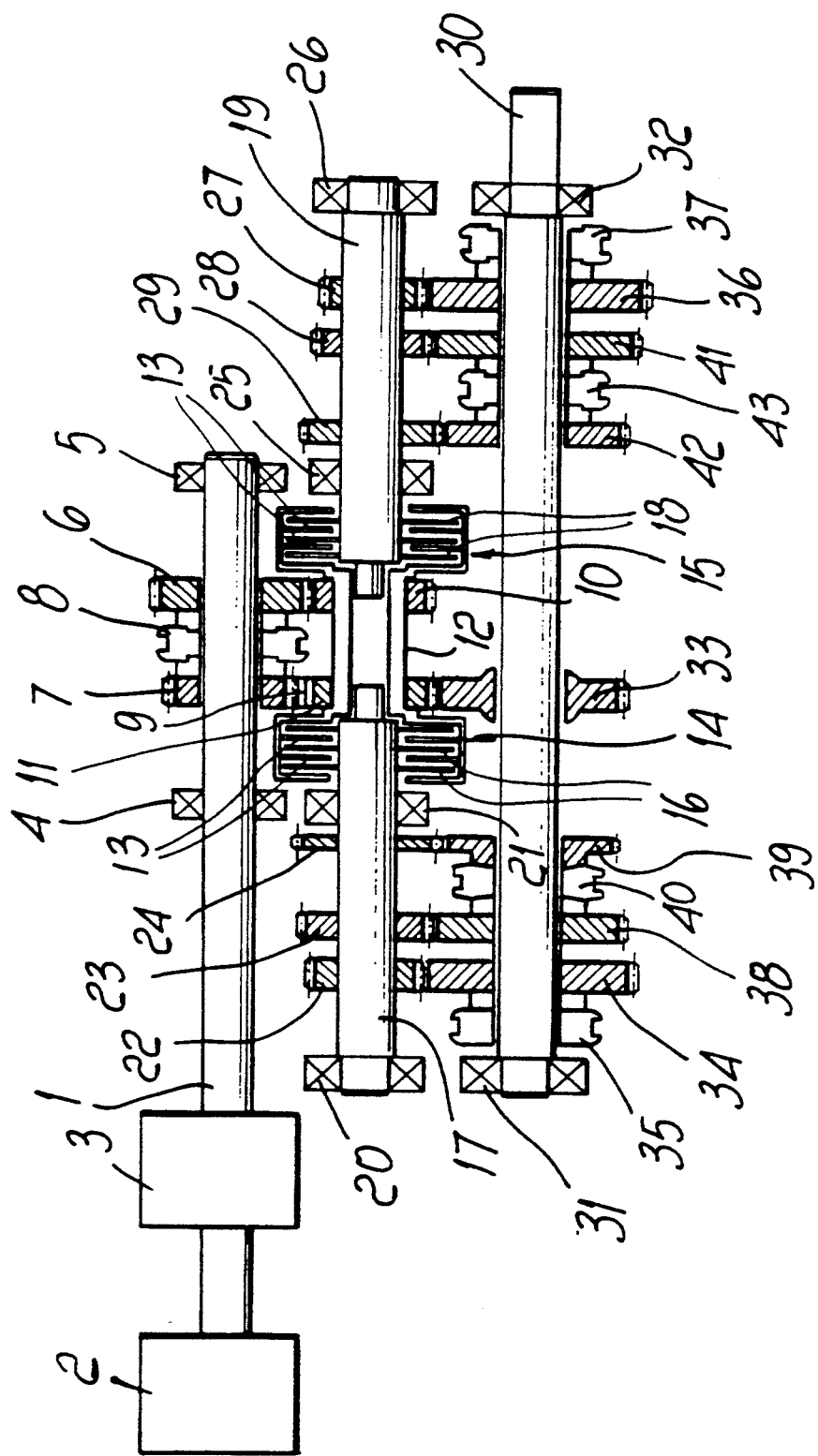
FIG. 1 is a diagram of a gearbox according to the invention.

With reference to the above FIG. 1, a three-shaft gearbox according to the invention comprises an input shaft 1, which is associable with a power unit 2 of the industrial vehicle, generally by means of a reduction unit 3; the input shaft 1, which is rotationally supported by ball bearings 4 and 5, supports a forward motion gear 6 and a reverse motion gear 7 which are normally in neutral position with respect to the input shaft 1 and can be selectively rigidly rotationally associated with the input shaft 1 by means of synchronization means which comprise synchromesh units 8.

The forward motion gear 6 and the reverse motion gear 7 mesh (with the interposition of a reversing sprocket 9 in the case of the gear 7) with respective transmission gears 10 and 11 which are keyed on a support 12 of a plurality of driving disks 13 of friction clutches or disk clutches 14 and 15.

The friction clutch 14 engages its plurality of driving disks 13 on driven disks 16 which are keyed on a first countershaft 17, whereas the friction clutch 15 engages its plurality of driving disks 13 on driven disks 18 which are keyed on a second countershaft 19.

The first countershaft 17, which is rotationally supported by ball bearings 20 and 21, supports odd-numbered speeds, i.e. the first-speed gear 22, the third-speed gear 23 and the fifth-speed gear 24, for an example of a six-speed gearbox, as illustrated in the accompanying figure. The second countershaft 19, which is rotationally supported by ball bearings 25 and 26, supports even speeds, i.e. the second-speed gear 27, the fourth-speed gear 28 and the sixth-speed gear 29, for the example at issue. The adaptations of the present invention to gearboxes with a greater or smaller number of gear ratios are obvious. The speed gears 22, 23, 24, 27, 28 and 29 are directly keyed on the respective countershafts 17 and 19.

The speed gears 22, 23, 24, 27, 28 and 29 mesh on respective speed output gears, as more clearly explained hereinafter, which are arranged on an output shaft 30, defining the related speed ratios.

The output shaft 30, which is rotationally supported by ball bearings 31 and 32, has a reverse speed output gear 33 which is keyed on the output shaft 30 and meshes with the transmission gear 11.

The first-speed gear 22 meshes with a first-speed output gear 34 which is normally in neutral with respect to the output shaft 30 and can be rotationally associated with said output shaft by means of synchromesh units 35.

The second-speed gear 27 meshes with a second-speed output gear 36 which is normally in neutral with respect to the output shaft 30 and can be connected to said output shaft by means of synchromesh units 37.

The third-speed gear 23 meshes with a third-speed output gear 38, and the fifth-speed gear 24 meshes with a fifth-speed output gear 39. The speed output gears 38 and 39 are normally in neutral with respect to the output shaft 30 and can be selectively rigidly rotationally associated with said output shaft by means of synchromesh units 40.

The fourth-speed gear 28 meshes with a fourth-speed output gear 41, and the sixth-speed gear 29 meshes with a sixth-speed output gear 42. The speed output gears 41 and 42 are normally in neutral with respect to the output shaft 30 and can be selectively rigidly rotationally associated with said shaft by means of synchromesh units 43.

In summary, operation is as follows: for example in the case of the preselection of a reverse speed, the synchromesh unit 8 rigidly rotationally associates the reverse speed gear 7 with the input shaft 1. The kinematic train which comprises the reverse speed gear 7, the reversing sprocket 9, the transmission gear 11 and the reverse speed output gear 33 is then actuated. The described kinematic train transmits the reverse motion to the output shaft 30. The reverse motion can in any case be reduced by the reduction unit 3.

For example in the case of the preselection of forward speeds, the synchromesh unit 8 rigidly rotationally associates the forward motion gear 6, which actuates the transmission gear 10 which in turn transmits the motion to the support 12. The motion received by the support 12 is transmitted to one of the countershafts 17 or 19. Assume, by way of example, that the third speed is preselected. In this exemplifying case, the friction clutch 14 is coupled, i.e. the driving disks 13 abut on the driven disks 16, thus causing the countershaft 17 to rotate. On the output shaft, the synchromesh unit 40 has rigidly associated therewith the third-speed output gear 39 with the output shaft 30, so that the motion received by the countershaft 17 is transmitted to the output shaft 30 by a kinematic train which comprises the third-speed gear 23 and the third-speed output gear 39. The equivalent is true both for the other odd-numbered speeds and for the even-numbered speeds. In the latter case, the engaged friction clutch is the disk clutch 15, and the driving disks 13 abut on the driven disks 18.

It is thus evident that the power flows completely from the input shaft 1 to the output shaft 30 exclusively through one of the two countershafts 17 or 19, which are included in the kinematic transmission train in a mutually exclusive manner. The friction clutches 14 and 15, which select through which of the two countershafts 17 or 19 the power flows, are necessary to automate the gearbox according to the invention, with an evident reduction of the number of friction clutches with respect to the known art. The problem of synchronization between the speeds is furthermore solved by means of the various synchromesh units mentioned in the above description, which further simplify both the operation of the gearbox according to the invention and its automation.

The invention thus conceived is susceptible to numerous modifications and variations, all of which are within the scope of the inventive concept- For example, the reverse motion gear can be supported by the second countershaft together with the even-numbered speeds, and intermediate-speed gears, supported by the input shaft, can be provided and can replace or integrate the forward and reverse speed gears.

A second application of this concept (FIG. 2) relates to a gearbox in which there are two hydrostatic motors associated by means of gears to the countershafts; said motors use the power, in the form of pressure and flowrate, of a fluid which hydraulically connects them to a pump which is associated with the main heat engine of the vehicle.

Figure 2:
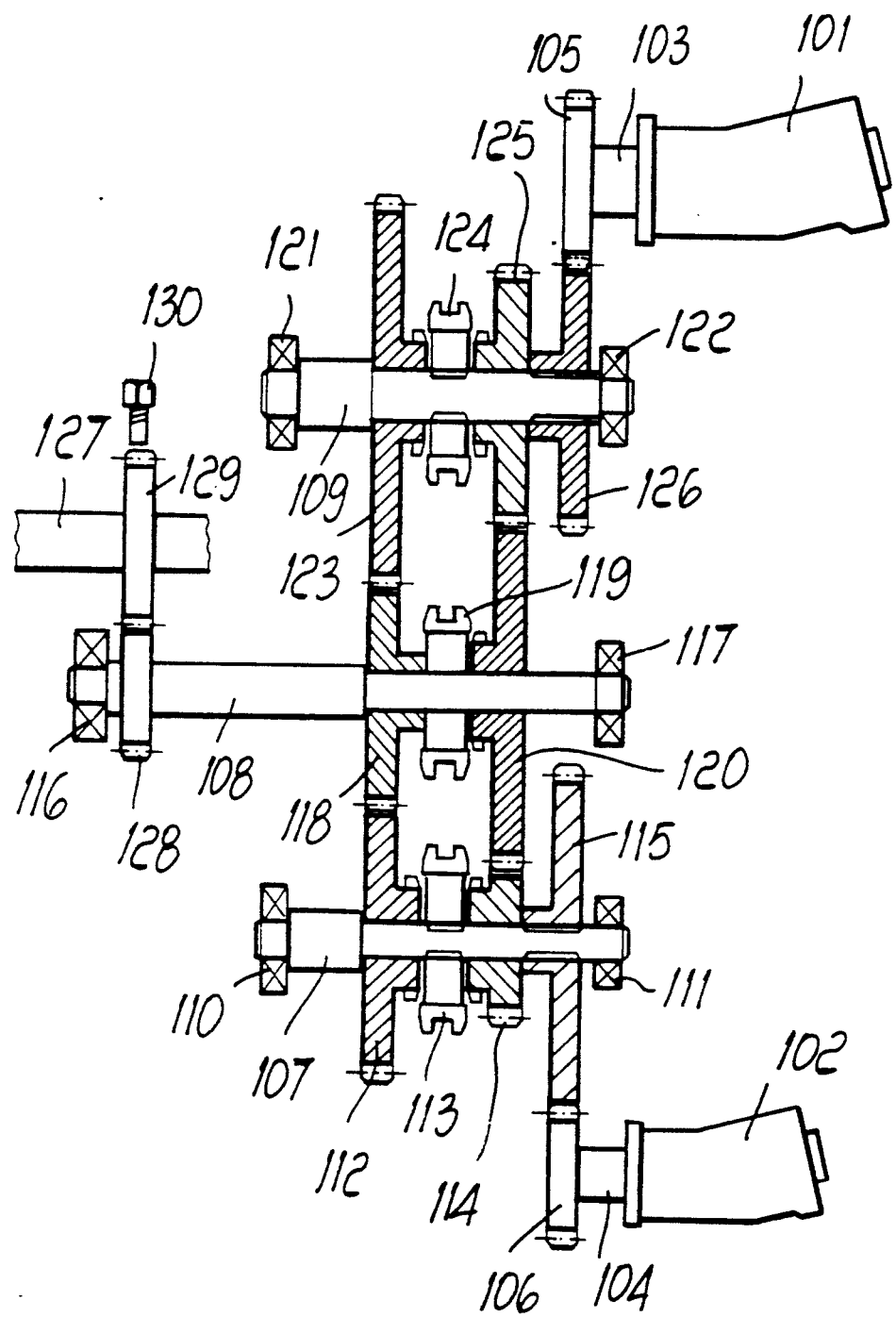
FIG. 2 is a diagram of a gearbox with two hydrostatic motors associated with the countershafts by means of gears.

With reference to said FIG. 2, a three-shaft gearbox according to the invention comprises a first hydraulic motor 101 connected to the gear 105 by means of the shaft 103; a second hydraulic motor 102 is connected to the gear 106 by means of the shaft 104; a first shaft 107 is rotationally supported by the bearings 110 and 111 on which the gear 115 is rigidly keyed, said gear 115 meshing with the gear 106 which is connected to the hydrostatic motor 102, which supports the gears 112 and 114 which can be selectively associated therewith by virtue of the synchronization means 113. A second shaft 109 is furthermore provided and is rotationally supported by the bearings 121 and 122; the gear 126 is rigidly keyed on said shaft 109 and meshes with the gear 105 connected to the hydrostatic motor 101, which supports the gears 123 and 125 which can be selectively rigidly associated therewith by virtue of synchronization means 124.

A third shaft 108 is rotationally supported by the bearings 116 and 117 and supports the gears 118 and 120, which can be selectively rigidly associated with said shaft 108 by virtue of synchronization means 119, and is rigidly connected to the output gear 128. The gears 118 and 120, together with the gears 112 and 114 are supported by the shaft 107 and together with the gears 123 and 125 which are supported by the shaft 109, define the speed ratios. The gear 129, rigidly connected to the output shaft 127, meshes with the output gear 128 which is keyed on the shaft 108. The velocity sensor 130 which faces the gear 129 is used to determine the velocity at which speed shifting is to be performed.

In industrial vehicles provided with a hydrostatic motor and pump, the maximum speed of the vehicle is limited by the overall conversion ratio which the system can provide (usually 9 times): these vehicles in fact have a working speed of approximately 2 km/h and a transfer speed of 18–20 km/h.

In order to be able to increase the transfer speed, multiple-speed gearboxes are necessary, but the solution with simple clutches (dog-clutches) requires the vehicle to stop during the speed shifting operation, whereas the powershift solution, besides being expensive, is also very difficult to provide due both to the high difference between the speeds (from 1.8 to 3.5) and to the considerable inertia which the hydrostatic unit opposes to running rate changes.

Units with two hydrostatic motors, which operate in parallel in low-speed, high-torque conditions and individually in high-speed, low-torque conditions, have therefore been studied. Even these latter solutions, however, do not allow high speeds or the use of compact hydrostatic units even for rather high installed power values (above 80 kW).

The aim of the invention is therefore to solve all of the above described problems by associating a three-shaft gearbox with two hydrostatic motors so as to be able to use them both in parallel, so as to obtain the maximum output torque with the highest usable mechanical ratio, and individually, so as to be able to change speed on the countershaft through which power is not transmitted.

The obtainable conversion ratio is given by the product of the conversion ratio of the pump and of the conversion ratio of the three-shaft gearbox $$c.r._{tot.} = c.r._{pump} \times c.r._{three\text{-}shaft\ gearbox}$$

If A is the conversion ratio of the two hydrostatic motors (A = maximum displacement/minimum displacement), if B is the ratio between the maximum displacement of the largest motor and the maximum displacement of the smallest motor ($1 < B < 1.5$) and if V is the maximum displacement per revolution of the smallest motor, the adjustment can generally be expressed by means of a series of relations the number whereof is a function of the number of speeds of said three-shaft gearbox.

For example, if one wishes to use two speeds for each countershaft, it is possible to provide a three-shaft gearbox with two double clutches for each countershaft and a clutch on the output shaft such as the one illustrated in FIG. 2 (the clutch 119 on the output shaft 108 disconnects the slow kinematic train in order to prevent it from reaching overspeed conditions at maximum velocity). This diagram is non-binding and is not exhaustive, but allows to better clarify the purpose and scope of the invention. The adjustment of the system can be expressed, in this case, as:

$$(A^4 \cdot B) \cdot V + (A^3) \cdot B \cdot V = (A^4 + A^3) \cdot (B) \cdot V \qquad 1)$$

$$(A^4 \cdot B) \cdot V/A + (A^3) \cdot B \cdot 0 = (A^3) \cdot (B) \cdot V \qquad 2)$$

$$(A^4 \cdot B) \cdot 0 + (A^3) \cdot B \cdot V = (A^3) \cdot (B) \cdot V \qquad 3)$$

-continued $$(A^{2*}B)^{*}0 + (A^{3})^{*}B^{*}V/A = (A^{2})^{*}(B)^{*}V \quad 4)$$

$$(A^{2*}B)^{*}V + (A^{3})^{*}B^{*}0 = (A^{2})^{*}(B)^{*}V \quad 5)$$

$$(A^{2*}B)^{*}V/A + (A)^{*}B^{*}0 = (A)^{*}(B)^{*}V \quad 6)$$

$$(A^{2*}B)^{*}0 + (A)^{*}B^{*}V = (A)^{*}(B)^{*}V \quad 7)$$

$$0^{*}0 + (A)^{*}B^{*}V/A = (B)^{*}V \quad 8)$$

where 0*0 indicates the condition in which the motor 102 is disconnected from the kinematic train by means of the clutches 113 and 119. The conversion ratio of the three-shaft gearbox (c.r.3 shafts=$A^4+A^3$) depends only on the adjustment of the motors 101 and 102, which is equal to A, and furthermore the ratios of said larger motor 101 are fixed (A and $A^3$), whereas those of the smaller motor 102 ($A^2B$ and $A^4B$) are directly proportional to the ratio between the motors B.

Indicating the conversion ratio of the pump with c.r.$_{pump}$, the total conversion ratio is therefore $$c.r._{total} = c.r._{pump} * (A^4 + A^3)$$

Considering the practical case of a power loader with a transfer speed of 38.18 km/h (40 legal km/h) and a working speed of 2 km/h, the total conversion ratio is equal to 38.18/2=19.09, of which 1.2 is due to the pump (in order to reduce dimensions and costs), whereas the gearbox has a conversion ratio of approximately 15.91, which is matched by an adjustment of the motors equal to 1.787.

A possible but not exclusive practical configuration could have the number of teeth of the gears illustrated in FIG. 2 according to the following table.

| Gear | Number of teeth |
|------|-----------------|
| 105  | Z = 29          |
| 106  | Z = 15          |
| 112  | Z = 30          |
| 114  | Z = 15          |
| 115  | Z = 46          |
| 118  | Z = 31          |
| 120  | Z = 46          |
| 123  | Z = 30          |
| 125  | Z = 15          |
| 126  | Z = 33          | obtaining the following ratios (B = 1.5):

$$I = \frac{46*46}{15*15} = 9.407$$

$$II = \frac{46*33}{15*29} = 3.489$$

$$III = \frac{31*46}{30*15} = 3.169$$

$$IV = \frac{31*33}{30*29} = 1.176$$

In the case of identical motors, the ratios of the first gears can be varied, obtaining:

$$I = \frac{46}{15} * \frac{46}{15} = 9.407$$

$$II = \frac{39}{22} * \frac{46}{15} = 5.436$$

$$III = \frac{31}{30} * \frac{46}{15} = 3.169$$

$$IV = \frac{39}{22} * \frac{31}{30} = 1.832$$

$$I = \frac{41}{20} * \frac{46}{15} = 6.287$$

$$II = \frac{46}{15} * \frac{33}{29} = 3.489$$

$$III = \frac{41}{20} * \frac{31}{30} = 2.118$$

$$IV = \frac{31}{30} * \frac{33}{29} = 1.176$$

depending on whether one wishes to obtain a high (1.832) or low (1.176) final reduction ratio (TV).

In practice, in the conditions of maximum thrust at working speed (2 km/h), the motors 101 and 102 have the maximum displacement and are in a low speed (I–II); the pump is adjusted to the minimum displacement in order to provide the maximum pressure difference. The first adjustment is to eliminate the flow which passes through the motor with the highest speed (I), reducing its displacement to zero.

At this point the rotation rate of the motor is indifferent with respect to the hydraulic connection, and all the power flows through the other motor, allowing the speed shift I→III with a simple synchromesh unit 124.

One proceeds in this manner with alternated steps up to the final step, in which the smallest motor 102 is shifted to the neutral position (using the central clutch 119 in order to avoid overspeeds and three-position adjustment of the double synchronization packs), and only the largest motor 101, shifted to the highest speed (IV), pushes the vehicle up to maximum velocity.

The small adjustment of the pump (1.2) is used to provide the necessary overlap to the various steps.

All the details may be replaced with other technically equivalent elements.

In practice, the materials employed, as well as the dimensions, may be any according to the requirements.

I claim:

1. Three-shaft gearbox particularly for industrial vehicles, comprising:
a rotatable first input countershaft (107);
a rotatable second input countershaft (109);
means (101, 103, 105, 126; 102, 104, 106, 115) for driving said first and second countershafts;
a rotatable output shaft (108);
at least one first input gear (112, 114) rotatably supported by said first input countershaft;
means (113) for rigidly connecting said first input gear with said first input countershaft;
at least one second input gear (123, 125) rotatably supported by said second input countershaft;
means (124) for rigidly connecting said second input gear with said second input countershaft;
at least one output gear (118, 120) rotatably supported by said output shaft; and
means (119) for rigidly connecting said output gear to said output shaft;
wherein both of said first and second input gears mesh directly with said output gear, the gearbox comprising:
a first said first input gear; a second said first input gear;
a first synchronization means for selectively rigidly connecting one of said first and second said first input gears to said first input countershaft; a first said second input gear; a second said second input gear; a second synchronization means for selectively rigidly connecting one of said first and second said second input gears to said second input countershaft; a first said output gear; a second said output gear; and an output synchronization means for rigidly connecting one of said first and second said output gears to said output shaft; wherein the first said first input gear and the first said second input gear both mesh with the first said output gear, and wherein the second said first input gear and the second said second input gear both mesh with the second said output gear.

2. The three-shaft gearbox according to claim 1, wherein said means for driving said first and second countershafts comprise: a first hydraulic motor with a first hydraulic motor output shaft; a first hydraulic motor gear rigidly connected to said first hydraulic motor output shaft; a first countershaft gear rigidly connected to said first input countershaft and meshing with said first hydraulic motor gear; a second hydraulic motor with a second hydraulic motor output shaft; a second hydraulic motor gear rigidly connected to said second hydraulic motor output shaft; and a second countershaft gear rigidly connected to said second input countershaft and meshing with said second hydraulic motor gear.

* * * * *